(12) United States Patent
Scotton et al.

(10) Patent No.: US 8,325,628 B2
(45) Date of Patent: Dec. 4, 2012

(54) DETERMINING PLACEMENT OF NODES WITHIN A WIRELESS NETWORK

(75) Inventors: Paolo Scotton, Horgen (CH); John N. Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 12/500,397

(22) Filed: Jul. 9, 2009

(65) Prior Publication Data

US 2011/0007663 A1    Jan. 13, 2011

(51) Int. Cl.
*H04L 12/16* (2006.01)
(52) U.S. Cl. .......... 370/255; 709/221; 702/104
(58) Field of Classification Search .......... 370/254–258; 709/220–222; 702/104
See application file for complete search history.

(56) References Cited

U.S. PATENT DOCUMENTS

| | | | | |
|---|---|---|---|---|
| 7,826,373 | B2 * | 11/2010 | Kolavennu et al. | 370/238 |
| 7,917,145 | B2 * | 3/2011 | Mahany et al. | 455/435.1 |
| 2006/0002368 | A1 * | 1/2006 | Budampati et al. | 370/351 |
| 2006/0171344 | A1 * | 8/2006 | Subramanian et al. | 370/315 |
| 2006/0171346 | A1 * | 8/2006 | Kolavennu et al. | 370/328 |
| 2007/0070909 | A1 * | 3/2007 | Reeve | 370/238 |
| 2009/0064295 | A1 * | 3/2009 | Budampati et al. | 726/6 |
| 2010/0220653 | A1 * | 9/2010 | Hwang et al. | 370/328 |
| 2010/0310258 | A1 * | 12/2010 | Wang et al. | 398/115 |
| 2011/0176416 | A1 * | 7/2011 | Bhatti et al. | 370/230 |

* cited by examiner

*Primary Examiner* — Ayaz Sheikh
*Assistant Examiner* — Mounir Moutaouakil
(74) *Attorney, Agent, or Firm* — Chau & Associates, LLC; Daniel P. Morris (57) ABSTRACT

A system of nodes including processors within a wireless sensor network includes an arrangement of the nodes with data connections therebetween within the wireless sensor network, wherein the data connections are limited to a set of distinct, non-intersecting paths, wherein each source node of the nodes is connected with a root nodes of the nodes by at least a predetermined number of the paths.

13 Claims, 5 Drawing Sheets

Naive solution

```
1: P = ALL Q = {}
2: LIST = ORDER_BY_PATH_FREQUENCY (P)
3: while NOTLIST.isEmpty() do
4:     n = REMOVE_HEAD_LIST(LIST)
5:     Q.add(n)
6:     if RESILSENT_CONDITION(Q) then
7:         RETURNQ
8:     end if
9: end while
```

(a) Simple Case

List of Feasible Paths

| From $S_1$ | $S_{11}$ = 1,2,3,4<br>$S_{21}$ = 1,6,7,4<br>$S_{31}$ = 1,5,6,7,4 |
|---|---|
| From $S_2$ | $S_{12}$ = 17,13,9,6,7,4<br>$S_{22}$ = 17,13,10,11,8,4<br>$S_{32}$ = 17,14,9,5,2,3,4 |
| From $S_3$ | $S_{13}$ = 18,14,10,7,4<br>$S_{23}$ = 18,15,11,7,4<br>$S_{33}$ = 18,15,16,8,4 |

Node Utilization

| Node | Utilization | Node | Utilization |
|---|---|---|---|
| 1 | - | 11 | 2 |
| 2 | 2 | 12 | 0 |
| 3 | 2 | 13 | 0 |
| 4 | - | 14 | 2 |
| 5 | 2 | 15 | 2 |
| 6 | 3 | 16 | 1 |
| 7 | 5 | 17 | - |
| 8 | 2 | 18 | - |
| 9 | 2 | 19 | 0 |
| 10 | 2 | 20 | 0 |

FIG. 5B                    FIG. 5C

FIG. 6 dipped onto the text of the page.

DETERMINING PLACEMENT OF NODES WITHIN A WIRELESS NETWORK

BACKGROUND

1. Technical Field

The present invention relates to wireless sensor networks and more particularly, to determining placement of nodes within a wireless sensor network.

2. Discussion of Related Art

A Wireless Sensor Network (WSN) comprises spatially distributed autonomous devices, the devices using sensors to cooperatively monitor physical or environmental conditions, such as temperature, sound, vibration, pressure, motion or pollutants, at different locations. For example, these networks are currently being used for industrial automation and retail and environmental monitoring. WSNs are typically constructed using small, battery-powered devices, each device including a general purpose processor, a radio transmitter and receiver, memory, and a range of sensors. Crossbow's® mote is an example of such a device.

It is generally acknowledged that the most valuable resource in such devices is battery power, as changing batteries involves a significant amount of human effort, particularly if the devices are located in remote or dangerous locations. The biggest draw on battery power is radio transmission, and protocols which minimize power usage by reducing the amount of transmissions that a given node needs to perform (e.g., through the use of epidemic protocols, by channel reservation, etc.) are regularly being developed.

Current models of radio communication can be extremely complicated, as they are influenced by factors such as the materials that the radio waves pass through, the nature of the surfaces that the radio waves reflect against, and other forms of radio communication occurring nearby. Practically, when a site is being equipped with a WSN, there is a need to test which nodes are capable of communicating with other nodes rather than being able to deduce connectivity from a model of the site. Consequently, significant effort is needed to determine the placement of wireless sensor nodes at an installation site.

The problem of determining the placement of nodes within a WSN can be described as an optimization problem. Cost efficiency suggests that a minimal set of nodes should be used while resiliency of the network suggests that a maximum number of paths should exist within the network. Since these two objectives are contradictory, a compromise is typically made, and a maximum number of nodes (e.g., 1000) and a minimum set of distinct paths between important points in the network (e.g., 3) is selected by a network architect.

Such WSNs are typically organized as trees (or forests) in which the root node connects the sensor network to a fixed network. Within the tree are nodes which gather data, referred to as source nodes, and nodes which simply relay data to the root. All leaf nodes in the tree are source nodes, but not all source nodes are leaf nodes. When determining the placement of nodes within a wireless sensor network, a maximum set of nodes that allows a minimum number of distinct trees to be built is selected, wherein each tree includes every source node. By selecting the nodes in this way, the wireless sensor network can survive failure of a number of nodes less than the minimum number of distinct trees. This is typically achieved through an ad-hoc process of testing settings at the installation site.

BRIEF SUMMARY

According to an embodiment of the present disclosure, a method for creating a wireless sensor network of nodes includes providing the wireless sensor network of the nodes, wherein each node includes a processor for communicating data across the wireless sensor network, determining all non-looping paths between a plurality of source nodes to a root node of the nodes, selecting a set of distinct, non-intersecting paths from the non-looping paths, wherein the set of distinct, non-intersecting paths includes a predetermined number of paths from each of the plurality of source nodes, and annealing the set of distinct, non-intersecting paths by replacing at least one node of the set of distinct, non-intersecting paths with an unused node having a lower cost.

According to an embodiment of the present disclosure, a computer readable medium embodying instructions executed by a processor performs a method for determining a placement of nodes within a wireless sensor network including providing an initial arrangement of the nodes within the wireless sensor network, determining non-looping paths between each of a plurality of source nodes and a root node of the nodes, and selecting a set of distinct paths to connect the nodes from the non-looping paths determining the placement, wherein the set of distinct paths includes every source node and the non-looping paths comprising the set of distinct paths do not intersect.

According to an embodiment of the present disclosure, a system of nodes including processors within a wireless sensor network includes an arrangement of the nodes with data connections therebetween within the wireless sensor network, wherein the data connections are limited to a set of distinct, non-intersecting paths, wherein each source node of the nodes is connected with a root nodes of the nodes by at least a predetermined number of the paths.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, a method for placing nodes in a Wireless Sensor Network (WSN) addresses placement, measurement and calculation.

A. Placement

Figure 1:
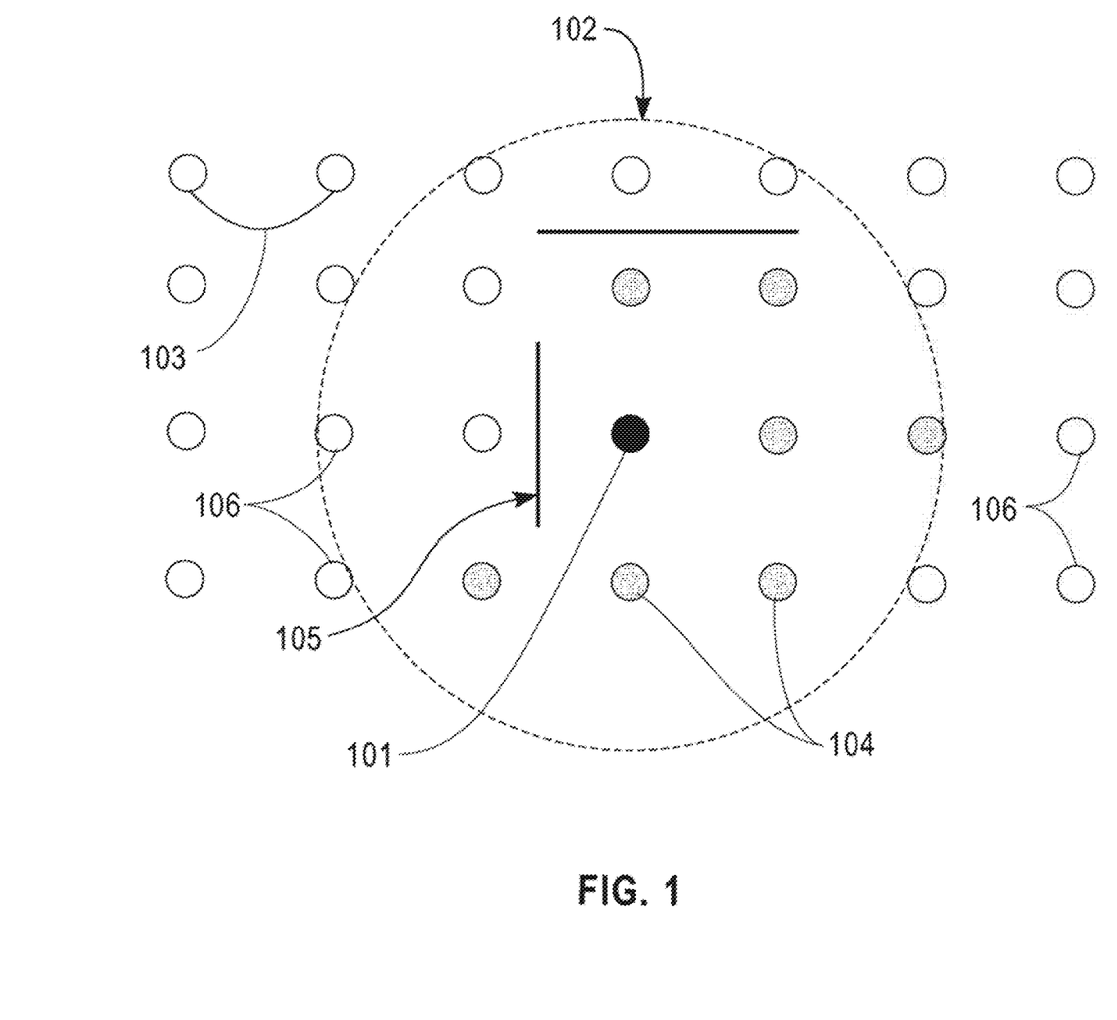
FIG. 1 illustrates a general schema for node placement according to an embodiment of the present disclosure.

The sensor nodes may be placed across the installation site in a regular pattern. This pattern can correspond to a grid or cube in which there is an equal distance between every node. However, not every site allows the sensor nodes to be placed in a regular pattern, and deviations from regularity may occur. The number of nodes placed during placement may be dense compared to the final expected network. For example, if the sensors have an expected line of site propagation distance of approximately 10 meters, the distance between sensors during placement can be set at approximately 5 meters, or at another distance less than 10 meters. As a result, many different paths can be evaluated during calculation. During placement, each node can be assigned a unique identifier. FIG. 1 illustrates the general schema for node placement according to an embodiment of the present disclosure. A source node 101 has an expected line of site propagation distance 102 of approximately 10 meters. All nodes are densely placed in comparison to the final expected network; thus, the distance 103 between all nodes is 5 meters. All non-source nodes 104 that are within the line of site propagation distance 102 of the source node 101 and are not obstructed by an obstacle 105 are able to communicate with the source node 101. All non-source nodes 106 that are either outside the line of site propagation distance 102 of the source node or obstructed by an obstacle 105 are unable to communicate with the source node.

B. Measurement

Figure 2:
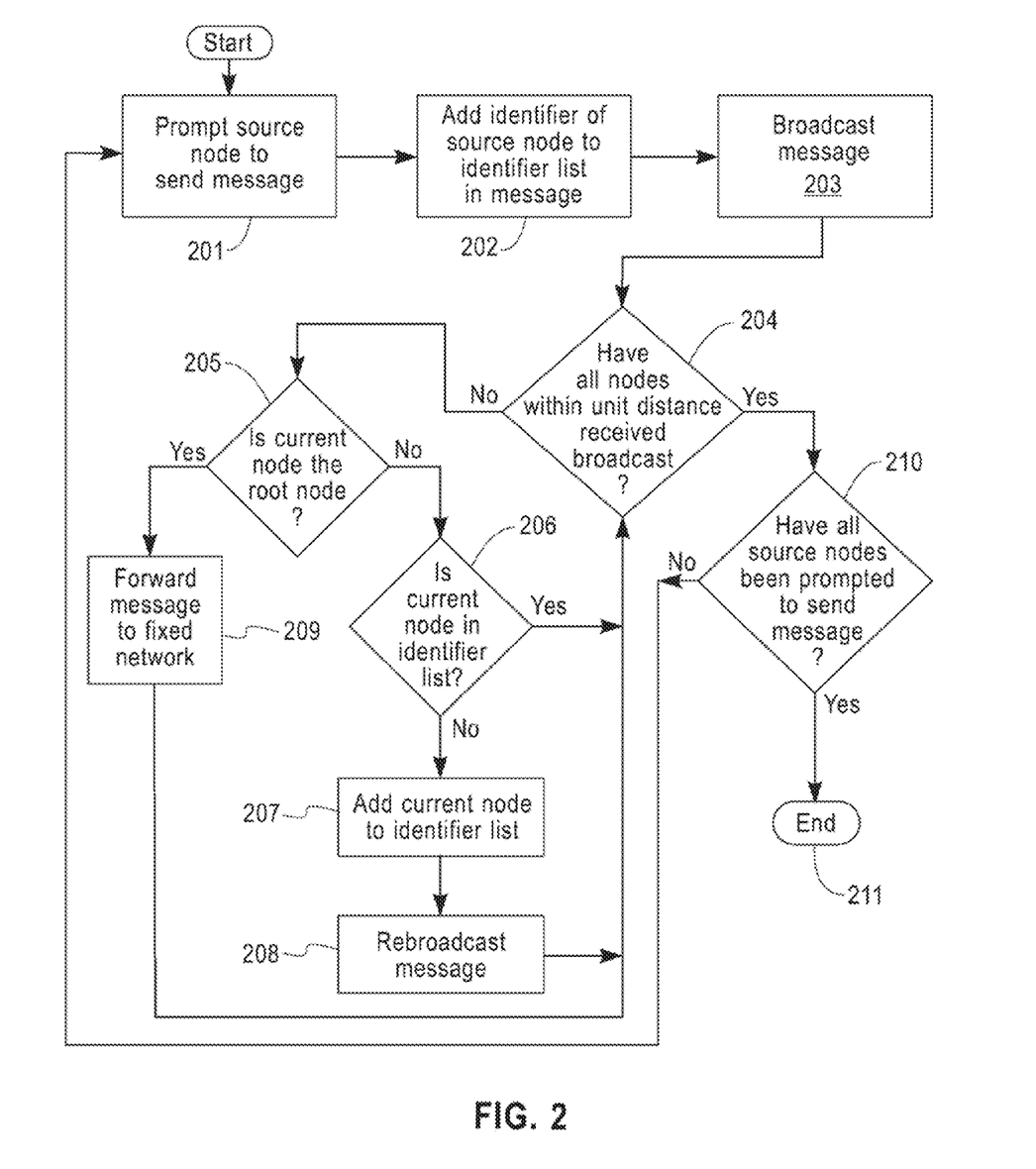
FIG. 2 illustrates a method for measurement according to an embodiment of the present disclosure.

FIG. 2 illustrates a method of measurement resulting in a set of loop-free paths from all source nodes to the root node according to an embodiment of the present disclosure. A source node is prompted to send a message at 201. The source node adds its identifier to an identifier list in the message at 202 and broadcasts the message at 203. If all nodes within unit distance have not received the broadcast at 204, and if the current node is not the root node at 205, the current node checks to see whether it is already in the identifier list at 206. If the current node is not already in the identifier list, the current node is added to the identifier list at 207 and rebroadcasts the message at 208. This process repeats until the root node is reached. Once the root node is reached at 205, it forwards the message from the sensor network to the fixed network at 209 where messages are stored. This is repeated for every message received by the root node. As a result, every non-looping path between the source node and the root node is obtained. Once completed, this process repeats for all remaining source nodes at 210, and continues until every path between every source node and the root node has been obtained.

Figure 3:
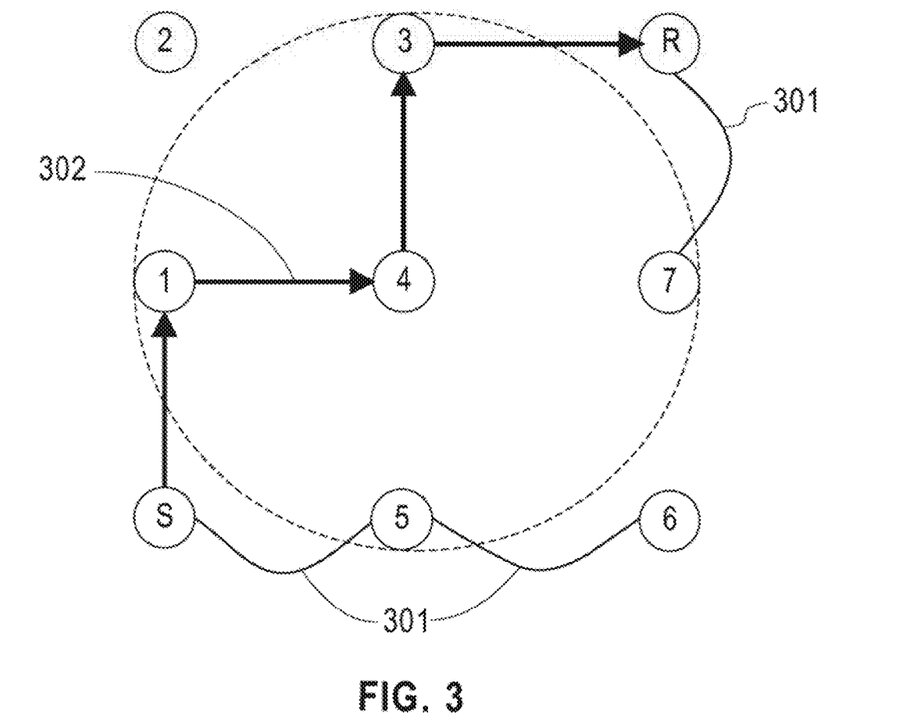
FIG. 3 illustrates a general schema for node placement according to an embodiment of the present disclosure.

FIG. 3 illustrates the general schema for node placement in which each node is on a grid with unit distance 301 between each node, and all nodes can only communicate unit distance 301. Note that there are 8 paths from S to R: (1,2,3), (1,4,3), (1,4,7), (1,4,5,6,7), (5,4,1,2,3), (5,4,3), (5,4,7) and (5,6,7). Path (1,4,3) 302 is depicted in FIG. 3. The number of unique paths in the example will grow as a quadratic function of the number of nodes, as each node can communicate with 4 other nodes.

C. Calculation

Measurement results in a complete set of loop-free paths from all source nodes to the root node. Calculation extracts a set of paths that allows the network to survive multiple failures of non-source nodes. For example, suppose the network shown in FIG. 3 has a resiliency target of surviving one failure. The set of paths extracted during calculation may be (1,2,3) and (5,6,7) or (1,4,3) and (5,6,7), as either of these sets can survive a single node failure. The cost for each of these solutions is equivalent, as the total number of nodes in each set of paths is 6.

When a wireless sensor network has multiple source nodes, a total set of nodes having substantially minimal cost while allowing a high resiliency can be chosen. For each source node, a set of distinct paths to the root node is established and a subset with a desired cardinality such that the union of all sets is substantially minimized is selected. Therefore, if $S_i$ is the set of disjoint paths from the $i_{th}$ source, and the number of required distinct paths is N:

$$\min\left(\text{card}\left(\bigcup_{\forall i} S_{xi}\right)\right) \text{ where } S_{xi} \subseteq S_i \text{ and } \text{card}(S_{xi}) \geq N$$

If there are p distinct paths to a source and the number of required resilient paths is k, the number of possibilities follows a binomial formula. Finding a minimal number of nodes for all sources involves trying every combination with every source. Thus, the number of possible combinations grows polynomially with the number of sources (e.g., if there are 3 possible combinations for every source, and there are 4 sources, the number of different configurations to be tested is $3^4$, or 81). Although it may be possible to test every path for a small number of nodes, as the number of nodes in a network increases, testing every possible path becomes difficult as a result of the factorial growth built into the binomial formula.

Figure 4:
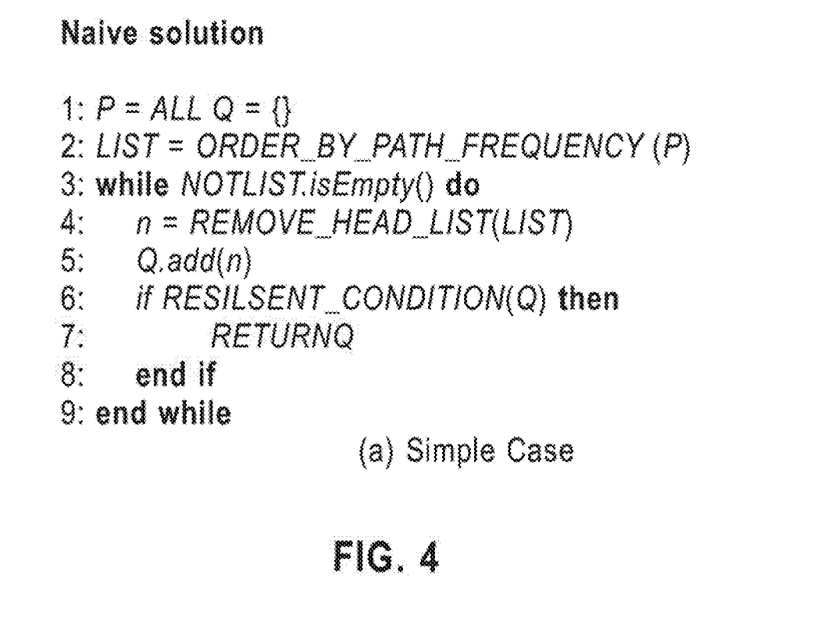
FIG. 4 illustrates a basic solution finding method according to an embodiment of the present disclosure.

In an embodiment shown in FIG. 4, a method that allows probabilistic and acceptable solutions to be found in polynomial time is shown. The method in FIG. 4 results in the discovery of the required number of existing resilient paths. The method utilizes a heuristic that orders the nodes by the number of paths they appear in, and adds the nodes, in that order, into a set. The resulting set is tested to determine whether it satisfies the resiliency condition for all sources. Because the method stops only when no nodes are remaining, a solution will be found, if one exists. However, the method may not result in an optimized solution (e.g., a maximum number of paths comprising a minimal set of nodes), since there may be sets that satisfy the resiliency condition with a smaller cardinality than the returned solution, Q.

A general technique for improving solutions to NP-complete problems is simulated annealing. An NP-complete problem exists when any given solution to the problem can be quickly verified, but there is no known efficient way to initially solve the problem. The time required to solve an NP-complete problem increases quickly as the size of the problem grows. Simulated annealing allows a method to stray away from the current solution along a path that is making the solution worse, as the solution may eventually improve. Thus, it avoids the problem of greedy algorithms that only look in the immediate vicinity around the current solution, to see if the solution can be improved. Simulated annealing takes into account the cost of the current solution, the cost of the neighboring solution, and the time spent searching without improving the solution, to decide whether the search should be moved to the new solution or be terminated. Given a solution Q, a method must be implemented that allows the search to move to a neighboring solution. Thus, the method first refers to the unused set P to identify whether, for any source, there is a path involving the top-most element of P that is shorter than a path in Q. If there is, the old path is replaced with the new path and all of the elements in the old path that are not in the new path are removed and placed in a set R. The resiliency condition is then tested. If the resiliency condition remains valid, the method has found a more efficient solution and the change remains. If the resiliency condition is invalidated by the change, the elements previously placed in R are added back into Q until the resiliency condition is validated. This method will either result in a more efficient solution or will revert back to the original solution by adding all elements previously removed to R back into Q. Combining the method shown in FIG. 4 and simulated annealing results in a technique that will probabilistically arrive at an accepted solution.

Figure 5A:
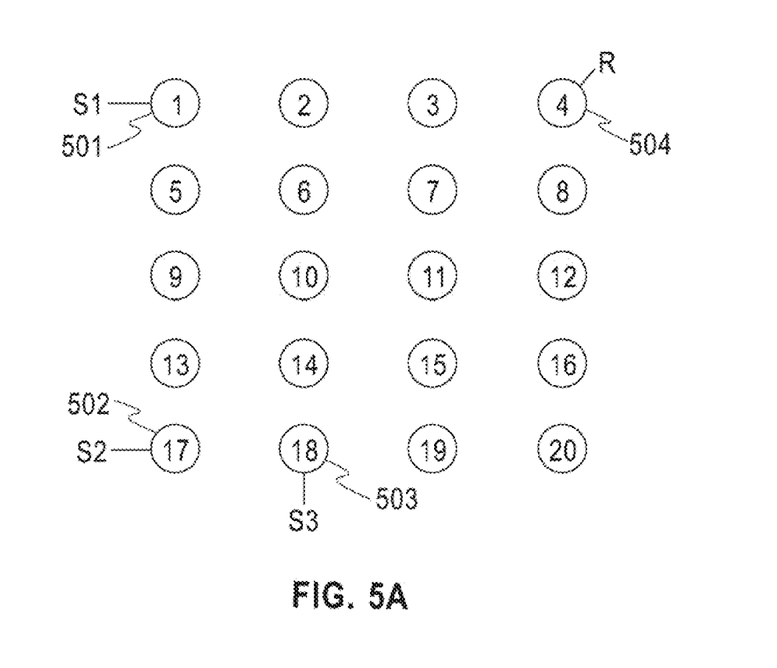
FIG. 5A illustrates a wireless sensor network comprising 20 total nodes, 3 source nodes, and a root.
Figure 5B:
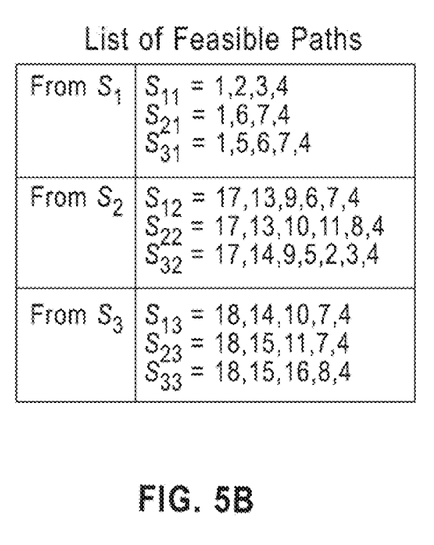
FIG. 5B is a table listing the feasible paths from each source node to the root in the wireless sensor network shown in FIG. 5A.
Figure 5C:
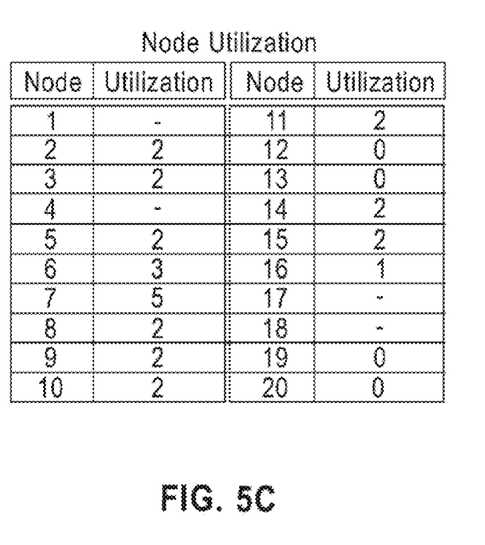
FIG. 5C is a table listing the number of times the nodes in FIG. 5A are used in the feasible paths listed in FIG. 5B.

FIG. 5A illustrates a wireless sensor network comprising 20 total nodes and 3 source nodes, $S_1$ 501, $S_2$ 502 and $S_3$ 503. FIG. 5B lists all feasible paths from each source node 501, 502, 503 to the root node 504. Assume that in this example, the targeted number of disjoint paths per source node is 2 (N=2). FIG. 5C summarizes the number of times each non-source node in the network is used in the feasible paths. Nodes are selected in decreasing utilization order. For example, node 7 has a utilization value of 5, appearing in $S_{21}$, $S_{31}$, $S_{12}$, $S_{13}$ and $S_{23}$. Because node 7 has the highest utilization value, it is the first node added to the solution set, Q. Node 6, which has the next highest utilization value (3), is then added to Q. With the addition of nodes 7 and 6 to Q, a single path from S1 501 to the root node 504 exists; $S_{21}$. Nodes 2 and 3, each having a utilization value of 2, are subsequently added to Q. With the addition of nodes 2 and 3 to Q, two distinct paths from S1 501 to the root node 504 exist; $S_{21}$ and $S_{11}$. This process continues until Q contains a sufficient number of nodes that allows two distinct paths from each source node 501, 502, 503 to the root node 504. Simulated annealing is then implemented to determine whether any unused nodes can be used to improve the solution set, Q. Each unused node is examined to determine whether it is used in a path from a source node to the root node which has a lower cost than any of the paths from that respective source node to the root node currently in Q. The cost of a path is the number of nodes in the path. For example, a path from a source node to the root node comprising 3 nodes has a lower cost than a path from the same source node to the root node comprising 5 nodes. If a node that is used in a path having a lower cost than a current path in Q is found, the current path in Q is replaced with the new path, including the previously unused node. If the resiliency conditions are satisfied (e.g., all paths from a given source node are distinct), the new path is retained. If the resiliency conditions are not satisfied, Q reverts back to the original solution.

Exemplary embodiments of the present disclosure may be realized taking into consideration implementation-specific decisions to achieve a specific goal(s), such as compliance with system-related and business-related constraints. Moreover, it will be appreciated that such a development effort might be complex and time-consuming, but would nevertheless be a routine undertaking for those of ordinary skill in the art having the benefit of this disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to exemplary embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is to be understood that embodiments of the present disclosure may be implemented in various forms of hardware, software, firmware, special purpose processors, or a combination thereof. In one embodiment, a method for low complexity signal analysis may be implemented in software as an application program tangibly embodied on a computer readable medium. The application program may be uploaded to, and executed by, a processor comprising any suitable architecture.

Figure 6:
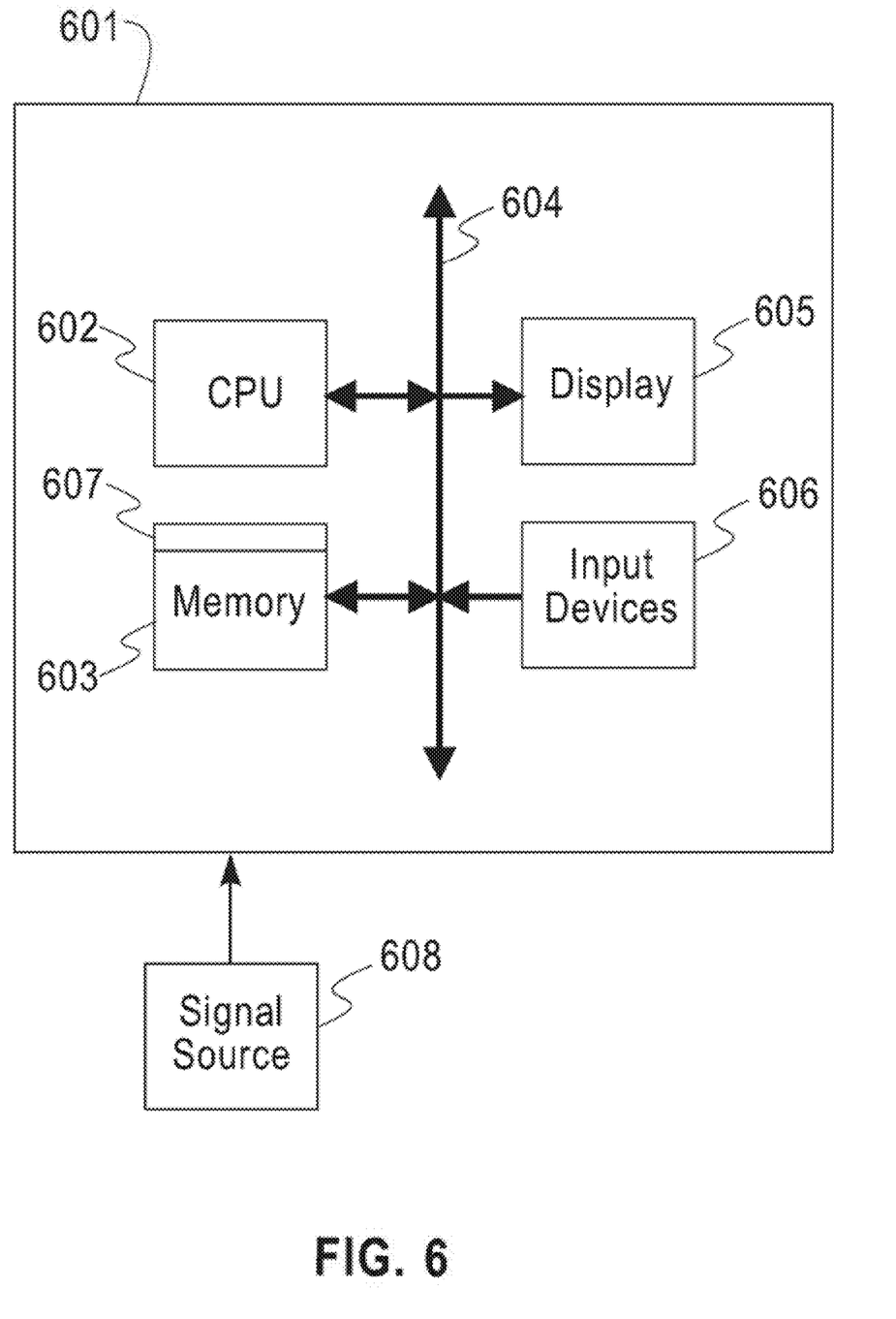
FIG. 6 is a computer system for executing computer readable code for determining node placement in a network according to an embodiment of the present disclosure.

Referring to FIG. 6, according to an embodiment of the present disclosure, a computer system 601 for determining placement of nodes within a wireless network can comprise, inter alia, a central processing unit (CPU) 602, a memory or computer readable medium 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. Exemplary embodiments of the present disclosure can be implemented as a routine 607 that is stored in memory 603 and executed by the CPU 602 to process the signal from the signal source 608. As such, the computer system 601 is a general-purpose computer system that becomes a specific purpose computer system when executing the routine 607 of the present disclosure.

The computer platform 601 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner of programming. Given the teachings of the present disclosure provided herein, one of ordinary skill in the related art will be able to contemplate these and similar implementations or configurations.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having described exemplary embodiments for a system and method for determining placement of nodes within a wireless network, it is noted that modifications and variations can be made by persons skilled in the art in light of the above teachings. It is therefore to be understood that changes may be made in embodiments of the present disclosure which are within the scope and spirit of the disclosure as defined by the appended claims. Having thus described the invention with the details and particularity required by the patent laws, what is claimed and desired protected by Letters Patent is set forth in the appended claims.

What is claimed is:

1. A method for creating a wireless sensor network of nodes, comprising:
   providing the wireless sensor network of the nodes, wherein each node includes a processor for communicating data across the wireless sensor network;
   determining all non-looping paths between each of a plurality of source nodes and a root node of the nodes;
   selecting a set of distinct, non-intersecting paths from the non-looping paths, wherein the set of distinct, non-intersecting paths includes a predetermined number of paths from each of the plurality of source nodes, and includes every source node; and
   annealing the set of distinct, non-intersecting paths by replacing at least one node of the set of distinct, non-intersecting paths with an unused node having a lower cost,
   wherein a unique identifier is assigned to each node, and determining all non-looping paths comprises:
   a) adding a corresponding unique identifier to a message and broadcasting the message a unit distance from a given source node,
   b) adding a corresponding unique identifier to the message at each of nodes within a unit distance of the given source node and rebroadcasting the message the unit distance, resulting in a plurality of messages, upon determining that the unique identifier of the respective node is not already in the message, and
   c) repeating step b) until every one of the plurality of messages is received by the root node.

2. The method of claim 1, further comprising placing the nodes in a regular pattern.

3. The method of claim 2, wherein the regular pattern comprises one of a grid and a cube.

4. The method of claim 1, further comprising forwarding each message received by the root node to a fixed network for storage.

5. The method of claim 1, wherein steps a) through c) are repeated for each of the plurality of source nodes.

6. The method of claim 1, wherein selecting the set of distinct, non-intersecting paths comprises:
   determining a node utilization number for each of a plurality of non-source nodes, wherein the node utilization number represents a number of times the corresponding non-source node appears in a plurality of feasible paths from the plurality of source nodes to the root node; and
   adding the plurality of non-source nodes to a solution set in an order based on the node utilization number corresponding to each non-source node.

7. A computer readable storage medium embodying instructions executed by a processor to perform a method for determining a placement of nodes within a wireless sensor network, the method steps comprising:
- providing an initial arrangement of the nodes within the wireless sensor network;
- determining all non-looping paths between each of a plurality of source nodes and a root node of the nodes; and
- selecting a set of distinct paths from the non-looping paths to utilize for communication between the source nodes and the root node, wherein the set of distinct paths includes every source node, and the non-looping paths comprising the set of distinct paths do not intersect,
- wherein a unique identifier is assigned to each node, and determining non-looping paths comprises:
- a) adding a corresponding unique identifier to a message and broadcasting the message a unit distance from a given source node,
- b) adding a corresponding unique identifier to the message at each of nodes within a unit distance of the given source node and rebroadcasting the message the unit distance, resulting in a plurality of messages, upon determining that the unique identifier of the respective node is not already in the message, and
- c) repeating step b) until every one of the plurality of messages is received by the root node.

8. The computer storage readable medium of claim 7, further comprising placing the nodes in a regular pattern.

9. The computer readable storage medium of claim 8, wherein the regular pattern comprises one of a grid and a cube.

10. The computer readable storage medium of claim 7, further comprising forwarding each message received by the root node to a fixed network for storage.

11. The computer readable storage medium of claim 7, wherein steps a) through c) are repeated for each of the plurality of source nodes.

12. The computer readable storage medium of claim 7, wherein selecting a set of distinct paths comprises:
- determining a node utilization number for each of a plurality of non-source nodes, wherein the node utilization number represents a number of times a node appears in a plurality of feasible paths from the plurality of source nodes to the root node; and
- adding the plurality of non-source nodes to a solution set in an order based on the node utilization number corresponding to each non-source node.

13. The computer readable storage medium of claim 12, wherein selecting the set of distinct paths further comprises an annealing to replace at least one node of the set of distinct paths with an unused node having a lower cost.

* * * * *